US012613330B2

(12) United States Patent
Graham et al.

(10) Patent No.: US 12,613,330 B2
(45) **Date of Patent: *Apr. 28, 2026**

(54) SYSTEMS AND METHODS FOR USING A CONDUCTED ENERGY WEAPON IN CONJUNCTION WITH A NONINVASIVE DETECTION OF IMPERMISSIBLE OBJECTS

(71) Applicant: Lassen Peak, Inc., North Bend, WA (US)

(72) Inventors: Hatch Graham, North Bend, WA (US);
Ehsan Afshari, Ann Arbor, MI (US);
Karl Triebes, Kirkland, WA (US);
Ryan Kearny, Kirkland, WA (US);
Carl Rushmeyer, San Mose, CA (US)

(73) Assignee: Lassen peak, inc., North bend, WA (US)

( * ) Notice: Subject to any disclaimer, the term of this patent is extended or adjusted under 35 U.S.C. 154(b) by 634 days.

This patent is subject to a terminal disclaimer.

(21) Appl. No.: 17/874,638

(22) Filed: Jul. 27, 2022

(65) Prior Publication Data

US 2025/0216546 A1      Jul. 3, 2025

Related U.S. Application Data

(63) Continuation-in-part of application No. 17/243,563, filed on Apr. 28, 2021, now Pat. No. 12,405,367.
(Continued)

(51) Int. Cl.
*G01S 13/88*        (2006.01)
*F41A 17/06*        (2006.01)
(Continued)

(52) U.S. Cl.
CPC ............ *G01S 13/887* (2013.01); *F41A 17/06* (2013.01); *F41H 13/0025* (2013.01);
(Continued)

(58) Field of Classification Search
CPC ................... G01S 13/887; G01S 13/89; G01S 2013/0245; G01S 7/032; G01S 7/35; F41A 17/06; F41H 13/0025
See application file for complete search history.

(56) References Cited

U.S. PATENT DOCUMENTS 6,359,582 B1    3/2002  Macaleese
7,209,035 B2    4/2007  Tabankin
(Continued)

FOREIGN PATENT DOCUMENTS

CA          2841179 A1 *  1/2013  ............. G01S 17/74
WO     WO 2007086916 A2     2/2007
(Continued)

OTHER PUBLICATIONS

"IEEE Standard for Radar Definitions," p. 42 in IEEE Std 686-2017 (Revision of IEEE Std 686-2008) Sep. 13, 2017, doi: 10.1109/IEEESTD.s017.8048479 (Year: 2017).
(Continued)

*Primary Examiner* — Matthew M Barker

(57)                 ABSTRACT

A system comprises a conducted energy weapon configured to emit at least one conductive probe in substantially an aimed direction, along with a housing containing a portable radar system with both a ranging resolution and lateral resolution sufficient to detect an object concealed on a person. The housing can be rigidly mounted on or in the conducted energy weapon, and the portable radar system can, when in operation, emit a radar beam and to receive a reflection of the emitted radar beam.

8 Claims, 7 Drawing Sheets

Related U.S. Application Data

(60) Provisional application No. 63/288,942, filed on Dec. 13, 2021, provisional application No. 63/043,779, filed on Jun. 25, 2020.

(51) Int. Cl.

| | |
|---|---|
| *F41H 13/00* | (2006.01) |
| *G01S 7/03* | (2006.01) |
| *G01S 7/35* | (2006.01) |
| *G01S 13/89* | (2006.01) |
| *G01S 13/02* | (2006.01) |

(52) U.S. Cl.
CPC .............. *G01S 7/032* (2013.01); *G01S 7/35* (2013.01); *G01S 13/89* (2013.01); *G01S 2013/0245* (2013.01)

(56) References Cited

U.S. PATENT DOCUMENTS

| | | | |
|---|---|---|---|
| 7,920,088 B2 | 4/2011 | Thompson | |
| 7,973,704 B2 | 7/2011 | Storz | |
| 8,253,619 B2 | 8/2012 | Holbrook | |
| 8,472,884 B2 | 6/2013 | Ginsburg | |
| 8,547,274 B2 | 10/2013 | Reinpoldt, III | |
| 9,029,778 B1 | 5/2015 | Boyd | |
| 9,223,018 B2 | 12/2015 | Dayi | |
| 9,316,732 B1 | 4/2016 | Mohamadi | |
| 9,562,969 B2 | 2/2017 | Wang | |
| 9,575,172 B2 | 2/2017 | Charpentier | |
| 10,175,018 B1 * | 1/2019 | Campagna | H04N 23/57 |
| 10,247,809 B2 | 4/2019 | Testar et al. | |
| 10,754,027 B2 | 8/2020 | Dayi | |
| 10,948,587 B1 | 3/2021 | Boronse | |
| 11,550,028 B2 | 1/2023 | Melzer et al. | |
| 11,598,866 B2 | 3/2023 | Sleasman | |
| 11,607,151 B2 | 3/2023 | Yarkoni | |
| 12,332,027 B2 * | 6/2025 | Basche | H04N 7/185 |
| 2003/0162521 A1 | 8/2003 | Vorenkamp | |
| 2004/0090359 A1 | 5/2004 | Mcmakin | |
| 2004/0140924 A1 | 7/2004 | Keller et al. | |
| 2006/0017605 A1 | 1/2006 | Lovberg | |
| 2008/0129581 A1 | 6/2008 | Douglass | |
| 2008/0304044 A1 | 12/2008 | Cooper et al. | |
| 2009/0040308 A1 | 2/2009 | Temovskiy et al. | |
| 2009/0184889 A1 | 7/2009 | Kier | |
| 2010/0090886 A1 | 4/2010 | Beasley | |
| 2010/0117885 A1 | 5/2010 | Holbrook | |
| 2010/0214150 A1 | 8/2010 | Lovberg | |
| 2011/0181300 A1 | 7/2011 | Bowring | |
| 2011/0304498 A1 | 12/2011 | Yanagihara et al. | |
| 2012/0075477 A1 | 3/2012 | Daly | |
| 2012/0081544 A1 | 4/2012 | Wee | |
| 2012/0293355 A1 | 11/2012 | Marianer et al. | |
| 2013/0033574 A1 | 2/2013 | Kuznetsov | |
| 2013/0201080 A1 | 8/2013 | Evans | |
| 2013/0201081 A1 | 8/2013 | Evans | |
| 2013/0207830 A1 | 8/2013 | Watts et al. | |
| 2014/0144009 A1 | 5/2014 | Chattopadhyay | |
| 2015/0085133 A1 | 3/2015 | Teich et al. | |
| 2015/0185314 A1 | 7/2015 | Corcos et al. | |
| 2015/0285907 A1 | 10/2015 | Mohamadi | |
| 2015/0293221 A1 | 10/2015 | Ahmed | |
| 2016/0116581 A1 | 4/2016 | Mohamadi | |
| 2016/0139258 A1 | 5/2016 | Vellas | |
| 2016/0223669 A1 | 8/2016 | Assefzadeh | |
| 2016/0291148 A1 | 10/2016 | Ellenbogen | |
| 2017/0031004 A1 | 2/2017 | Jales | |
| 2017/0038467 A1 | 2/2017 | Levita | |
| 2017/0212059 A1 | 7/2017 | Charvat et al. | |
| 2018/0217249 A1 | 8/2018 | La Salla et al. | |
| 2019/0293833 A1 | 9/2019 | Chen | |
| 2020/0064966 A1 | 2/2020 | Giusti et al. | |
| 2020/0064996 A1 | 2/2020 | Giusti | |
| 2020/0109926 A1 | 4/2020 | Mata | |
| 2020/0217948 A1 | 7/2020 | Wang | |
| 2020/0311899 A1 | 10/2020 | Piette | |
| 2020/0326416 A1 | 10/2020 | Albasha et al. | |
| 2020/0341493 A1 | 10/2020 | Sabato | |
| 2020/0389624 A1 | 12/2020 | Oberholzer | |
| 2020/0408899 A1 | 12/2020 | Nanzer | |
| 2021/0018595 A1 * | 1/2021 | McFadden | G01S 13/887 |
| 2021/0148679 A1 | 5/2021 | Basche et al. | |
| 2021/0278526 A1 | 9/2021 | Pedross-Engel | |
| 2021/0405182 A1 | 12/2021 | Reynolds | |
| 2022/0066065 A1 | 3/2022 | Zhao | |
| 2022/0179062 A1 | 6/2022 | Amir | |
| 2022/0221576 A1 | 7/2022 | Zhao | |
| 2022/0357123 A1 * | 11/2022 | Prudent | F41A 19/58 |
| 2022/0365205 A1 | 11/2022 | Gal | |
| 2022/0390590 A1 | 12/2022 | Marchese | |

FOREIGN PATENT DOCUMENTS

| | | | | |
|---|---|---|---|---|
| WO | WO 2009067627 A1 | 5/2009 | | |
| WO | WO 2009131806 A1 | 10/2009 | | |
| WO | WO2018169517 A1 | 9/2018 | | |
| WO | WO-2020236761 A2 * | 11/2020 | | F41H 13/0025 |

OTHER PUBLICATIONS

Heydari Payam: "Invited" Integrated millimeter-wave/terahertz sensor systems for near-field IoT, 2016 53nd ACM/EDAC/IEEE Design Automation Conference (DAC), IEEE, Jun. 5, 2016 (Jun. 5, 2016).

K. Statnikov, J. Grzyb, N. Sarmah, B. Heinemann and U. R. Pfeiffer, "A lens-coupled 210-270 GHz circularly polarized FMCW radar transceiver module in SiGe technology," 2015 European Microwave Conference (Eu MC), Paris, France, 2015, pp. 550-553, doi: 10.1109/EuMC.2015.7345822. (Year: 2015).

J. Grzyb, K. Statnikov, N. Sarmah, B. Heinemann and U. R. Pfeiffer, "A 210-270-GHz Circularly Polarized FMCW Radar With a Single-Lens-Coupled SiGe HBT Chip," in IEEE Transactions on Terahertz Science and Technology, vol. 6, No. 6, pp. 771-783, Nov. 2016, doi: 10.1109/TTHZ.2016.2602539. (Year: 2016).

P. Hillger, J. Grzyb, R. Jain and U. R. Pfeiffer, "Terahertz Imaging and Sensing Applications With Silicon-Based Technologies," in IEEE Transactions on Terahertz Science and Technology, vol. 9, No. 1, pp. 1-19, Jan. 2019, doi: 10.1109/TTHZ.2018.2884852. (Year: 2019).

A. J. Seeds et al., "Coherent terahertz systems," 2012 IEEE International Topical Meeting on Microwave Photonics, Noordwijk, Netherlands, 2012, pp. 278-281, doi: 10.1109/MWP.2012.6474112.

* cited by examiner

116

Major
Program
Code

Fastpath
VHDL & C

Tensorflow
Lite

Control Plane
Python / C

Petalinux

110

User
Controls

Buttons 111     LEDs 115     Mic & Speaker 113

Camera 112     Display Panel 114

105

Systems &
Communications

Wireless
Communication 106     Battery 108

107

Electrical Connection
109

101

300 GHz Coherent Radar System on Chip

Core
Processing
System on
Chip

Processor 103

Custom Logic 104

102

301 Images are taken

302 Images sent to processor

303 Images are increased in size

304 Align larger images

305 Average the layers of the aligned images

306 Sharpen image stack

307 Resize the super image

308 Final image created

SYSTEMS AND METHODS FOR USING A CONDUCTED ENERGY WEAPON IN CONJUNCTION WITH A NONINVASIVE DETECTION OF IMPERMISSIBLE OBJECTS

CROSS REFERENCE TO RELATED APPLICATIONS

This application claims priority to U.S. Provisional Patent Application No. 63/288,942, filed on Dec. 13, 2021 and titled "Systems and Methods for Using a Conducted Energy Weapon in Conjunction with a Noninvasive Detection of Impermissible Objects," the contents of which are hereby incorporated by reference in their entirety; this application claims further priority as a continuation-in-part to U.S. Patent Application No. 63/043,779, filed on Jun. 25, 2020 and titled "Systems and Methods for Noninvasive Detection of Impermissible Objects," the contents of which are hereby incorporated by reference in their entirety, which claims priority to U.S. Provisional Patent Application No. 63/043,799, filed on Jun. 25, 2020 and titled "Systems and Methods for Noninvasive Detection of Impermissible Objects," the contents of which are hereby incorporated by reference in their entirety.

BACKGROUND

Over time, conducted energy devices ("CEWs"), also called conducted energy devices ("CEDs"), are increasingly by law enforcement as an alternative to the use of the firearms because CEWs are not considered deadly force. The safety of CEWs such as Tasers and stun guns, however, has been called into question as the link between these weapons and sudden in-custody death has been studied and adjudicated. In fact, the evolving caselaw surrounding called excessive force and its relationship to the use of CEWs have steered many agencies away from reliance on such weapons. Increasingly, law enforcement rules are proscribing the use of CEWs for controlling resisting suspects or subduing fleeing suspects in the absence of an immediate threat of physical harm to an officer or others, thus limited the use of CEWs to the same or similar use of more lethal weapons such as handguns.

In spite of these circumscribed uses, however, law enforcement continues to use CEWs, finding them a less lethal options to handguns or other weapons. Nevertheless, use of these devices has been controversial, given the pain and loss of control they impart, and because of the rare but real possibility of death after a CEW is used on a subject.

Research has revealed that improper use of a CEW—for instance, too many activations of the device, prolonged exposure, or use on the chest, thus risking heart abnormalities—can cause significant injury or be a factor in those rare occasions when death follows CEW exposure. Because of this, the Fourth Circuit has stated about CEWs that "Taser use is unreasonable force in response to resistance that does not raise a risk of immediate danger." Even this formulation, however, can be too broad and does not account for situations where an unrestrained arrestee, though resistant, presents no serious safety threat.

Thus, a need exists for a way of minimizing CEW use to situations where such use is absolutely necessary, such as where a resisting subject is carrying a concealed weapon, while reducing CEW use where it is not absolutely necessary.

SUMMARY

Embodiments of the present invention involve breakthrough innovations to revolutionize how determining the necessity of using a CEW by determining whether a subject is armed and thus presents deadly risk to law enforcement. Embodiments include a handheld CEW device such as a Taser, where the handheld device includes or is otherwise in communication with high-resolution imaging systems that are capable of detecting objects hidden under, for example, people's clothing, or within a bag, or elsewhere. Using embodiments of the present invention, a user can safely conduct a weapons search without being in physical contact with the subject being searched, and if no weapons are determined to exist, the user may consider a reduced use-of-force, including eliminating the use of the CEW based on an assumption that less forceful means may be deployed after the device confirms the absence of weapons.

Embodiments of the present invention implement, on a single chip, previously bulky and expensive devices, a radar that can provide the scanning and imaging functions prior to engaging a subject with a CEW. Embodiments of these innovations include components such as a low noise, high bandwidth Voltage Controlled Oscillator (VCO) to attain a center frequency exceeding 200 MHz, a coherent mixer that improves receive sensitivity by 1000× over existing solution, and a full on-chip multi-element scanner that eliminates the need for external antennas or element arrays. Furthermore, embodiments include process innovations allowing these chips to include low-cost 55 nm CMOS or SiGe semiconductors, or other readily available processes.

Embodiments of the invention include a method or methods for subduing or controlling a subject after finding a concealed-object detection using one or more handheld, portable, battery operated, electromagnetic scanning apparatuses configured to operate at distance of two to ten feet. In an embodiment, the operator conducting the object search positions the subject to be scanned at a distance of up to approximately six to ten feet (or more) from the apparatus and initiates the scan. The apparatus emits non-visible electromagnetic radiation in the Terahertz (THz) frequency band between approximately 0.1 and 1 THz as part of the scanning process. In an embodiment, the apparatus employs a phased array antenna in conjunction with a voltage controlled oscillator (VCO) to steer the emitted beam both vertically and horizontally to transmit electromagnetic radiation and deterministically illuminate the subject of the scan. Reflected electromagnetic radiation is received by an antenna on the apparatus and coherently mixed with the transmitted signal, allowing differential phase and amplitude information to be recovered. In an embodiment, the received signal is converted from time domain to frequency domain creating data that is used to produce an image. In an embodiment, the resultant image is further processed using a pattern matching algorithm (or a combination of algorithms) to identify objects within the field of view of the apparatus. The objects can be compared against a database of known objects and the operator is alerted and/or the CEW is activated in the case of a match, or not engaged (or disabled) in the case of no match.

In an embodiment, the apparatus is configured to show only suspicious objects on a representation of a subject's body, and not to provide any images of the subject's actual body. In an embodiment, the apparatus is configured to provide a visual representation of a suspicious object. In an embodiment, the apparatus is configured to display where on a subject's body the suspicious object can be found. In an embodiment, the apparatus is configured to provide an audible, visible, or mechanical warning that a suspicious object exists, thus allowing allow the searcher to keep their hands free during the scan. In an embodiment, the apparatus is used in a handheld mode. In an embodiment, the apparatus is used in a hands-free mode, and can be attached to the searcher's clothing or hung from the searcher's body, or attached to the searcher's equipment. In an embodiment, the apparatus can be attached to airborne or terrestrial vehicles, such as, but not limited to drones, automobiles, or robotic systems. In an embodiment, the apparatus can be used in conjunction with, or as part of, a body-worn camera. In an embodiment, the apparatus can be configured to be in communication with a network, and can upload both scanned data and metadata related to the scanned data, to a cloud-based or network-based system for further analysis and storage.

In addition to object detection, in embodiments, the apparatus can be configured to provide an image of a scanned subject's facial features even where the subject is wearing a mask or other clothing or covering. The resultant images can be subsequently used to determine the subject's identity either visually or through the use of a facial recognition system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

One or more of the systems and methods described herein describe a way of providing a system and method for noninvasive searches. As used in this specification, the singular forms "a" "an" and "the" include plural referents unless the context clearly dictates otherwise. Thus, for example, the term "a computer server" or "server" is intended to mean a single computer server or a combination of computer servers. Likewise, "a processor," or any other computer-related component recited, is intended to mean one or more of that component, or a combination thereof.

Figure 1:
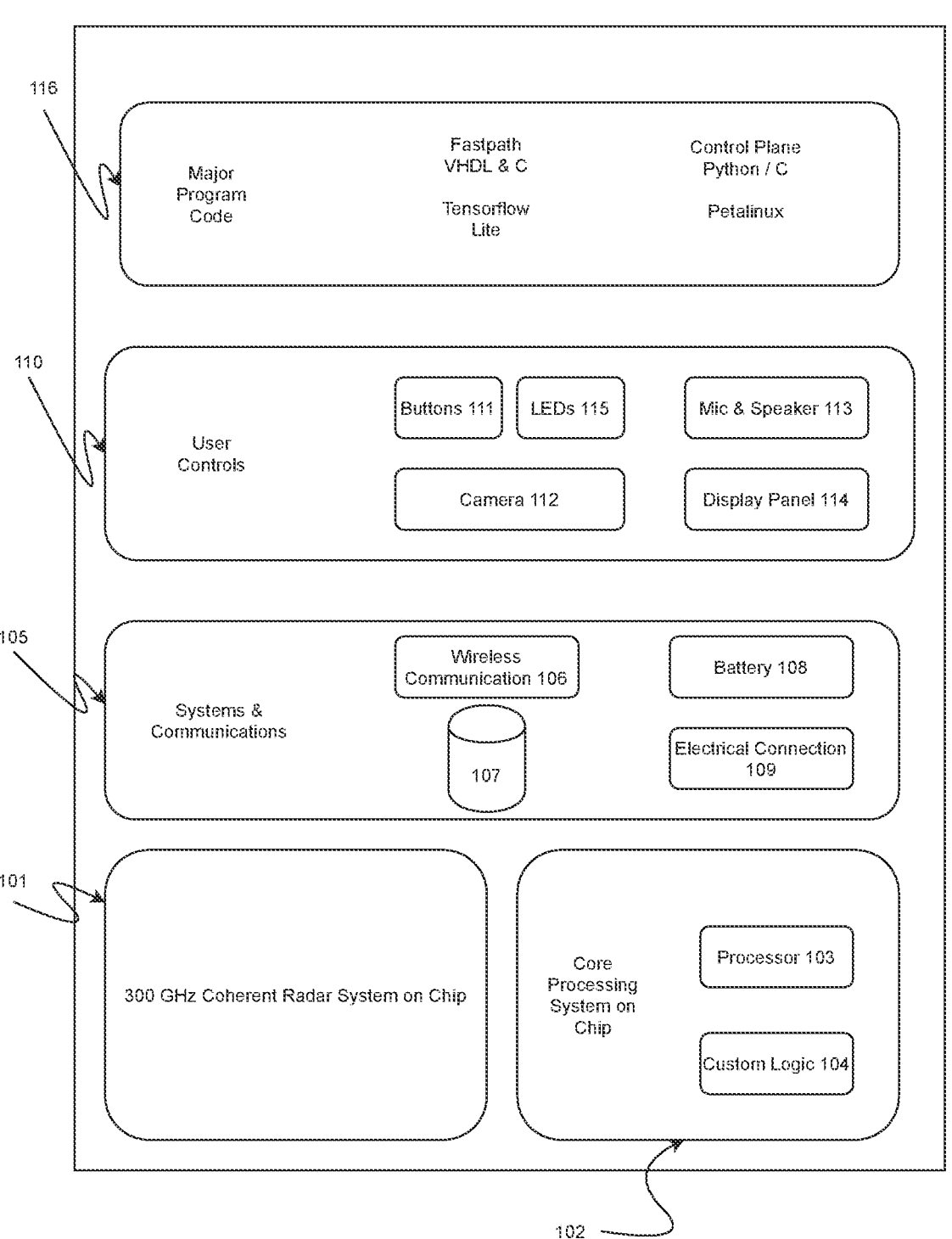
FIG. 1 is a block diagram of a system for providing a noninvasive imaging and detection system, according to an embodiment of the invention.

FIG. 1 is a block diagram of a system for providing a system for noninvasive imaging and detection. In an embodiment, the system comprises a coherent radar system on a chip 101, in communication with a core processing system 102. The core processing system 102 includes a processor 103 and custom logic 104.

The coherent radar system on a chip is configured to provide both range resolution and lateral resolution that is orders of magnitude greater than is found in the prior art. For a single radar chirp emitted by the chip, range resolution, which refers to the quantifiable distance to an object, is directly related to the bandwidth (fmax-fmin), where the available bandwidth is typically 5%-15% of the transmitted center frequency. Thus, the higher the center frequency, the higher the available bandwidth, and so the higher the ranging resolution. Because the chip is designed to operate in the THz range, the ranging resolution may be used to distinguish distances in the sub-millimeter range.

Lateral resolution, on the other hand, relates to the quantifiable distance between samples of perpendicular cross section (e.g., side to side and top to bottom). In other words, lateral resolution relates to feature resolution of a scan. As the transmitted signal is swept across the target (i.e., the target is scanned), the resultant received signed is processed to show variations in reflectivity from the scanned target. These variations can be processed by using standard techniques such as, but not limited to, a Fast Fourier Transform (FFT) to produce an image. The feature size, or resolution of the image, is directly proportional to the wavelength of the emitted source where the shorter wavelength provides increased resolution. Another way to describe this is to say lateral resolution is a function of both beamwidth and steering. Beamwidth is a function of wavelength divided by antenna dimension. As the frequency of the beam increases, its wavelength decreases, and hence, the beamwidth decreases. In addition, the more antenna elements found on the chip, the larger the dimension, and thus the tighter the beamwidth. The tighter the beamwidth, the higher the resolution of distinguishing cross-sectional differences. Thus, in the THz range where the chip operates, the device can provide sub millimeter lateral resolution. Coherence is used to achieve high receiver sensitivity, and allows for recovery of the difference of frequency between transmit and source. This high receiver sensitivity is used to obviate the need for transmitting a signal on the order of >1,000× or 30 dB higher in power, which would not allow for a single chip implementation of the radar.

In an embodiment, core processing system 102 includes processor 103 and custom logic 104. Processor 103 is configured to process instructions to render or display images, initiate a scan, process the results of a scan, alert the user, and provide the results of an object match, if any, to the user. Processor 103 can be any of a variety and combination of processors, and can be distributed among various types and pieces of hardware found on the apparatus, or can include hardware distributed across a network. Processor 103 can be an ARM (or other RISC-based) processor. Additionally, such processors can be implemented, for example, as hardware modules such as embedded microprocessors, Application Specific Integrated Circuits ("ASICs"), and Programmable Logic Devices, including flash memory ("PLDs). Some such processors can have multiple instruction executing units or cores. Such processors can also be implemented as one or more software modules in programming languages as Java, C++, C, assembly, a hardware description language, or any other suitable programming language. A processor according to some embodiments includes media and program code (which also can be referred to as code) specially designed and constructed for the specific purpose or purposes. Custom logic 104 can include one or more Field Programmable Gate Array(s) (FPGA) or any type of PLD for custom logic to support processing offload from Processor 103. In an embodiment, the term "processing offload" includes digital signal processing and digital beam forming.

Figure 6:
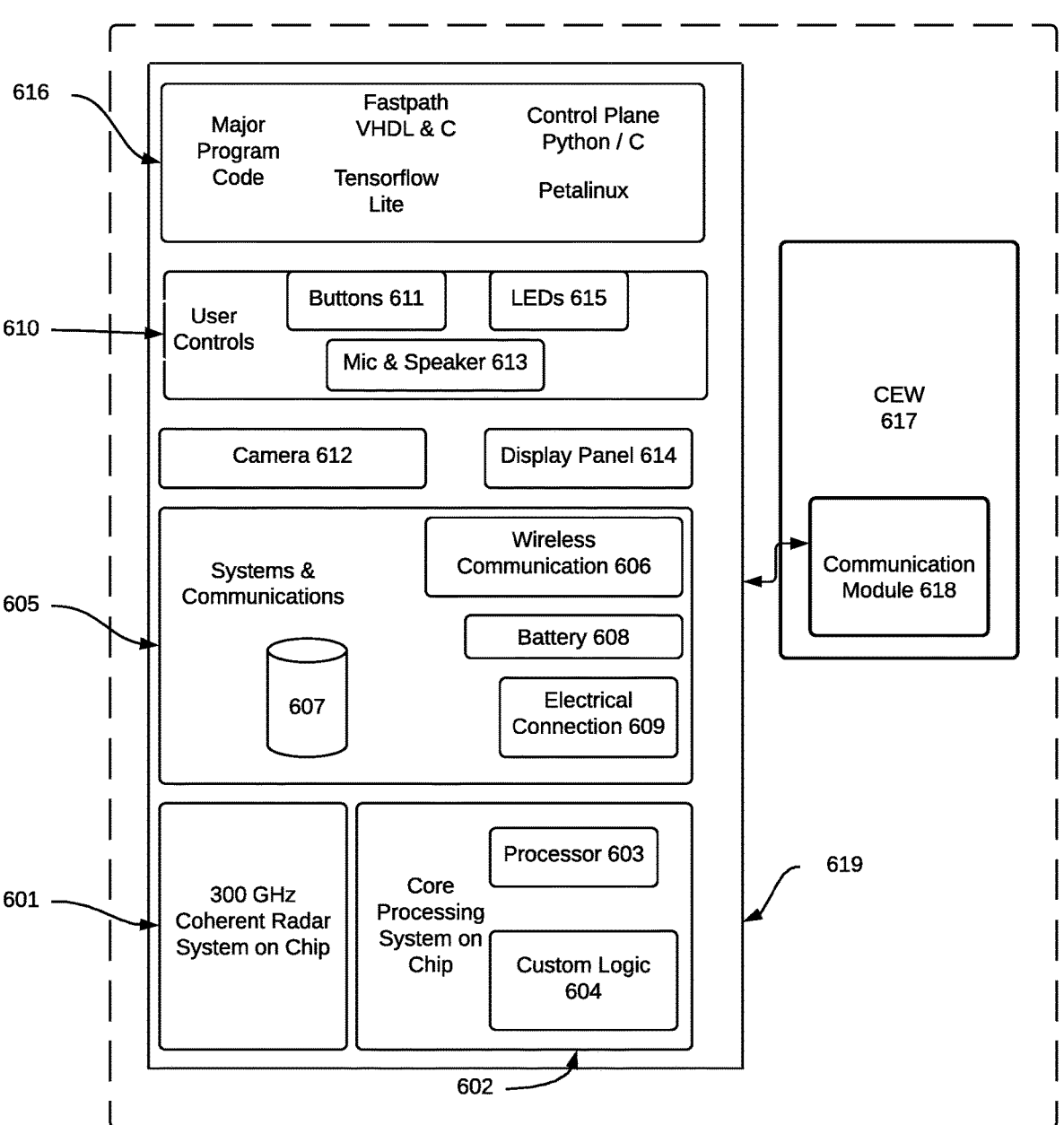
FIG. 6 is a block diagram of a system for providing a system for noninvasive imaging and detection, in conjunction with a CEW.

In communication with coherent radar system 101 and core processing system 102, are the systems and communications circuits 105, comprising wireless communications circuits 106 (and 606 in FIG. 6), Memory 107, power source 108, and an external electrical connection 109 (and 609 in FIG. 6). In an embodiment, the components may be housed within a single housing; in an embodiment, the components, including the coherent radar system on the chip 101, the memory 107, may be stored in separate housings as a need arises to separate chip 101 from memory 107.

Wireless communications circuits 106 can include any practicable wireless communications circuits including, but not limited to, a wireless fidelity ("Wi-Fi") or wireless local area network ("WLAN") connection, a wireless wide area network ("WWAN") connection, a Bluetooth connection, an LTE/5G connection, and/or a cellular connection.

Memory 107 can be used to store, in computer code, artificial intelligence ("AI") instructions, AI algorithms, a catalog of images, device configuration, an allowable, calculated, or predetermined user workflow, conditions for altering, device status, device and scanning configuration, and other metadata resulting from the scanning process. Memory 107 can be a read-only memory ("ROM"); a random-access memory (RAM) such as, for example, a magnetic disk drive, and/or solid-state RAM such as static RAM ("SRAM) or dynamic RAM ("DRAM), and/or FLASH memory or a solid-data disk ("SSD), or a magnetic, or any known type of memory. In some embodiments, a memory can be a combination of memories. For example, a memory can include a DRAM cache coupled to a magnetic disk drive and an SSD. Memory 107 can also include processor-readable media such as magnetic storage media such as hard disks, floppy disks, and magnetic tape; optical storage media such as Compact Disc/Digital Video Discs ("CD/DVDs), Compact Disc-Read Only Memories ("CD-ROMs), and holographic devices: magneto-optical storage media such as floptical disks; Solid state memory such as SSDs and FLASH memory; and ROM and RAM devices and chips.

Power source 108 can include any type of practicable battery (e.g., battery 608 in FIG. 6), including but not limited to, Lithium-ion, Nickel Cadmium, Nickel-Metal Hydride, and alkaline. Power source 108 can comprise an external power source coupled to circuitry internal to the device. USB connection 109 can be used to put the apparatus in communication with a network, or can be used to provide an electrical connection to charge or power the apparatus.

In an embodiment, the apparatus further includes User Controls 110. User Controls 110 include user buttons 111 (and 611 in FIG. 6) to manipulate the apparatus to turn the device on and off, to set the resolution, configure the device, or select a preconfigured setting, initiate a scan, initiate a connection with the cloud based service via one of the network interface (e.g., Wi-Fi, cellular, Bluetooth, or any other practicable interface) and control the camera functions. LEDs 115 can be used to provide feedback and information to the user about the state of the device, or about the results of a scan. Camera 112 is configured to capture optical images, and a microphone and speaker 113 (and 613 in FIG. 6) are configured to facilitate communication, including communication to third parties, or communication with the device through voice or audio commands, and for the device to provide sound to the user such as one or more alarms or notifications. Display panel 114 can be an LCD or other type of display panel configured to display messages to the user, or to provide images representing the results of a scan.

In an embodiment, the apparatus comprises major program-code components 116 used to operate and control the device, which can include the computer instructions executed by the apparatus in performing a scan, and other functions of the apparatus. Program-code components 116 can include, but are not limited to, micro-code or micro-instructions, machine instructions (such as produced by a compiler), and files containing higher-level instructions that are executed by a computer using an interpreter. Program code can include hardware, software, firmware, and any practical way of coding. For example, an embodiment may be implemented using HTML, Java, C++, or other object-oriented programming language and development tools. Additional examples of program code include, but are not limited to, control signals, encrypted code, and compressed code. Major program code can include, but is not limited to, a standard operating system (e.g., Linux), hardware drivers for software-managed hardware elements, machine-learning inferencing, image processing, image storage and retention, cloud-service interface, scanning process, user interface, device management, cryptographic functions, user access management, and device health.

Figure 5:
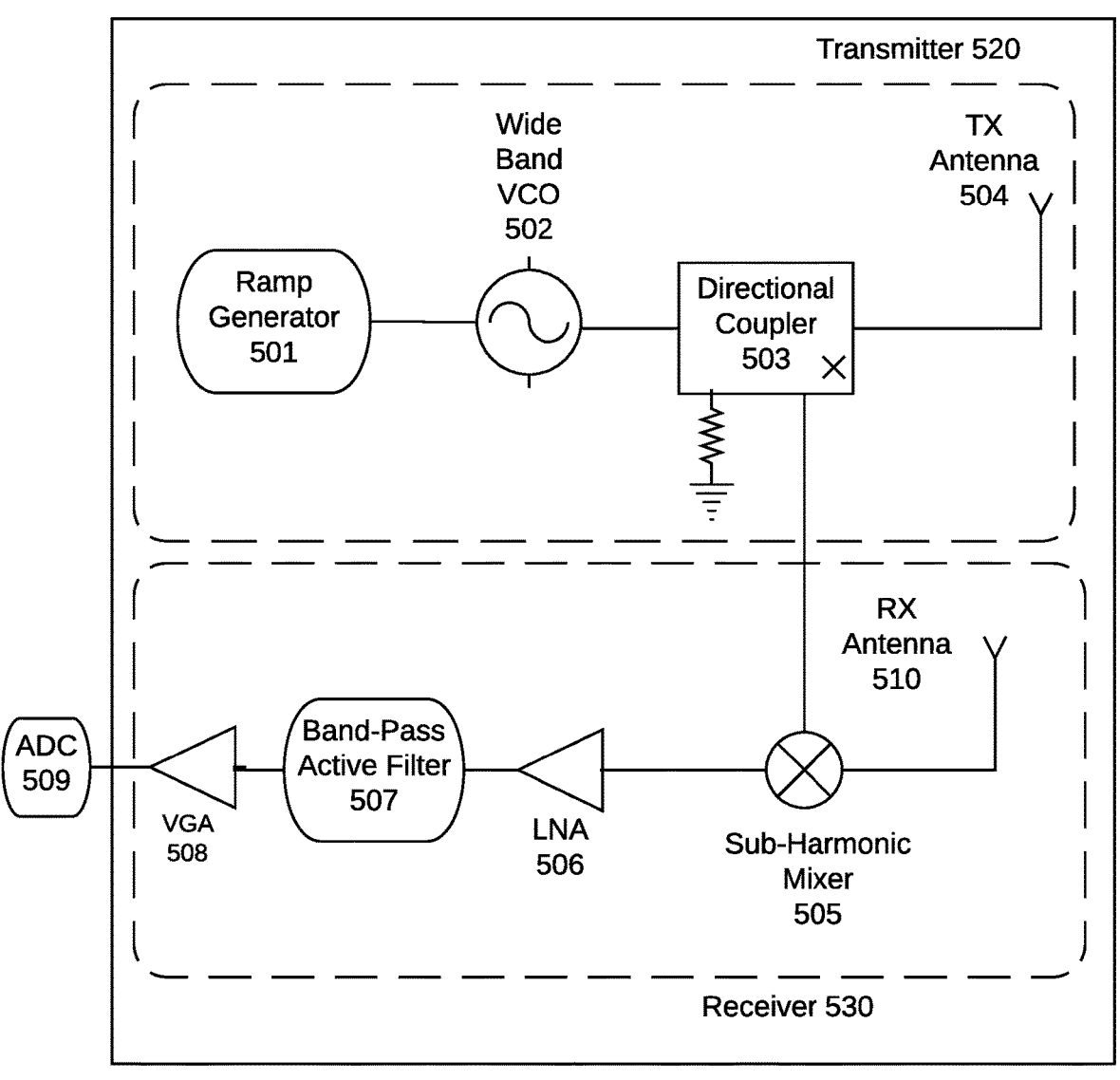
FIG. 5 is a block diagram of a schematic for a radar system on a chip (RSOC), according to an embodiment of the invention.

FIG. 5 is a block diagram for a schematic of a radar system on a chip (RSOC) used in an apparatus, according to the present invention. Notwithstanding anything else in the application, one skilled in the art will understand that the RSOC includes all the elements described with regard to FIG. 5 on a single chip (with the exception of ADC 509, addressed below). Generally, the RSOC transmits the high frequency signals via TX antenna 504, and receives the reflected signal via RX antenna 510, to produce a baseband analog signal that is digitized by an external analog-to-digital converter (ADC 509) and processed by digital processing logic and a CPU to product a visible image of the scanned target. The RSOC consists of two major functions; 1) A transmitter that produces the radar signal and initiates the scan and 2) a receiver that receives the reflected signal and recovers differential phase and frequency information, and provides that information to the digital processing system.

In an embodiment, Transmitter 520 consists of 4 major functional components: Ramp Generator 501, Wide-Band Voltage Controlled Oscillator (VCO) 502, Directional coupler 503, and a Phased-array element array 504. Ramp generator 501 is configured to provide a voltage signal to Wide Band VCO 502, which controls the center frequency of the VCO nominally centered between approximately 0.1 to 1 THz. Ramp Generator 501 is configured to move the center frequency of Wide Band VCO 502 over a predetermined frequency that creates a frequency sweeping action to produce the radar scan. Ramp Generator 501 can generally produce a sawtooth voltage waveform, however, other waveforms such as ramp, sinusoid, flat, or combinations thereof, may be employed as well. The Wide Band VCO 502 can be is implemented to produce low phase noise, thus improving the receiver's receiver sensitivity. The signal from Wide Band VCO 502 can then be provided to Directional Coupler 503, which can create at least two coherently related identical versions of the input signal. One of the two versions of the input signal is provided to the sub-harmonic mixer as a coherent reference, and the other version of the input signal is provided to the phased array element antenna. Each element in the system acts as an antenna and employs a phase-locked oscillator coherently related to the signal from Wide Band VCO 502 to ensure a fixed phase relationship from adjacent transmitting elements, which can be used for, for example, to attenuate unwanted sidelobes. The high frequency energy produced by the elements is focused using an external radar lens (not shown), generally implemented as a hemispherical component of radar transmissive material, to scan the target and create the reflected high frequency energy to be received by Receiver 530.

Receiver 530 consists of 5 major functional elements: 1) Receive Antenna (RX Antenna) 510; 2) Sub Harmonic Mixer 505; 3) Low Noise Amplifier (LNA) 506; 4) Band Pass Active Filter 507; and 5) Variable Gain Amplifier (VGA) 508. Receive Antenna 510 is configured to receive the reflected signal broadcast by the transmitter and reflected from the target. RX Antenna 510 may be implemented as a dipole antenna, or by any other practicable antenna configuration. The signal received at RX antenna is provided to the sub-harmonic mixer, which can then create sum and difference frequencies based on the reference signal provided by the transmitter. The sum and difference frequencies are coherently related, and enable the receiver to recover differential phase and frequency, thus improving the noise figure of the receiver by up to approximately 10,000× (or 40 dB) as compared to traditional non-coherent receivers. LNA 506 is used to amplify the signal as required by Band Pass Active Filter 507. Band Pass Active Filter 507 filters off undesirable harmonics created by the Sub-Harmonic Mixer 505. The term 'active' refers to the use of active elements to include linearly biased transistors in conjunction with reactive and passive elements to provide the bandpass filter with minimized or reduced noise and phase distortions of the passed signal. VGA 508 receives the signal from band-pass filter and amplifies and provides the necessary impedance matching for external ADC 509. In an embodiment, ADC 509 is implemented functionally on the RSOC. In an embodiment, ADC 509 is implemented external to the RSOC.

Figure 2:
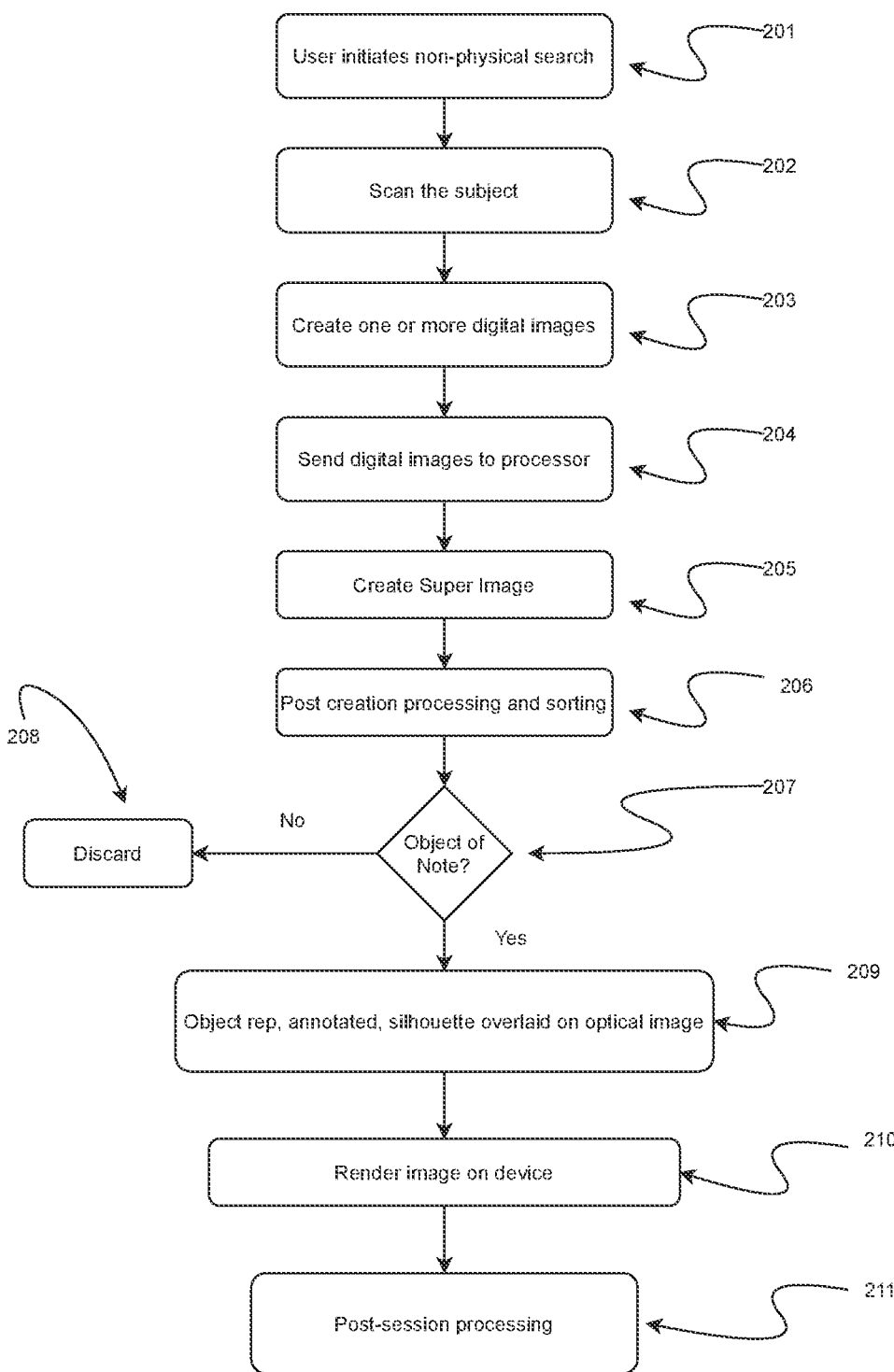
FIG. 2 is a flow chart of a process for noninvasive concealed-object detection, according to an embodiment of the invention.

FIG. 2 is a flow chart of a method for using a non-invasive scanner for creating images useful for imaging and detection. Prior to use, in an embodiment, the apparatus will have, and will be in, one of a set of operational modes and or states, including a low-power or standby mode, a synching mode, and an off mode. A user can generally tell, based on the apparatus's display, whether the apparatus is in an operational mode or not. In an embodiment, the apparatus will be able to show the local user which state the apparatus is in, via LEDs (e.g., LEDs 615 in FIG. 6), local LCD panel, or using an audible warning. If the apparatus is in an off mode, then the apparatus is powered off and does not perform any scanning. In an embodiment, the apparatus can be in a state that requires user interaction to set up the apparatus in sync mode and connect it to an online network for backup and additional functionality such as uploading data and metadata. In an embodiment, the apparatus can be set to sync automatically through the online network.

In sync mode, the apparatus can send and receive operational control parameters such as a cryptographic device key for device or user login to the system, user-configuration data detailing, for example, who is using the apparatus, what organization or department the user belongs to, updates to the machine-language inferencing engine, relevant (e.g., user or departmental) policies and controls, including general policies on alert, event, and trigger actions. In addition, the operational control parameters can include information detailing how full the device disk is, and whether upload is required. In an embodiment, the machine-language inferencing engine is the process that performs the object pattern matching and subsequent identification. In an embodiment, it can be implemented in software and accelerated using and FPGA. In an embodiment, it can be implemented in hardware. In an embodiment, it can be implemented in any practicable combination of hardware and software.

In the low power or standby mode, in an embodiment, the apparatus is operational and ready for use. In an embodiment, network access exists, along with a live connection to any related network services. In another embodiment, no network access exists. The apparatus can include sufficient local storage and processing power for operating independent of a network. The apparatus can further include a timer along with a device key to allow a user to use the apparatus as long as the timer has not timed out, thus ending the user session on the apparatus.

In embodiments, other modes that can be used by the apparatus include active-target-acquisition mode, and active-non-physical-search-in-process mode. In active-target-acquisition mode, the apparatus will show or relate the field of view to the user with an active camera and preparing to go to state 5. State 5 defines the system being in the active state of a non-physical search. In this state, the apparatus imaging system pipeline and real-time alerts and notifications are active.

In an embodiment, if the device is ready for use, then at 201, the user initiates a non-physical search of a subject. In an embodiment, the initiation of the non-physical search can begin with a user setting up a subject between 5 and 10 feet away from the apparatus. The subject can then be asked to look at the user and/or the apparatus. The user can then point the apparatus toward the subject and turn on the scanning function of the device via a button, trigger, voice control, or other control switch.

At 202, in an embodiment, the apparatus scans the subject. To do this, in an embodiment, the radar system on a chip generates a radar signal and sweeps a predetermined field of view, emitting a radar signal in the 0.1 to 1 THz range. The apparatus employs a phased array antenna in conjunction with a voltage controlled oscillator (VCO) to steer the emitted beam to transmit electromagnetic radiation and deterministically illuminate the subject of the scan, according to an embodiment. To complete the scan, the emitted signal interacts with the subject, and a certain amount of the electromagnetic radiation is reflected back and received by an antenna on the apparatus. The received signal is coherently mixed with the transmitted signal allowing differential phase and amplitude information to be recovered. In an embodiment, the transmit signal is combined, or mixed, with the returning signal allowing for recovery of frequency and phase information in the receive signal.

At 203, in an embodiment, the analog signal from the scan is converted to a digital format using one or more analog-to-digital converters (ADCs) to create a digital image that can be forwarded to the processing complex of the apparatus. In an embodiment, the process of scanning and creating an image can be repeated a predetermined number of times (programmed into the apparatus or selected by the user) creating multiple digital images.

At 204, in an embodiment, the multiple images are sent to the processor, and in 205, the multiple images are combined in the processor to form a super image to enhance resolution, creating a super image. The steps of this super imaging process are detailed in FIG. 3, discussed below. At 205, the feature resolution of the image is enhanced, thus improving the chances for object recognition in 206.

Once the post creation processing and sorting has been performed at 206, a determination is made at 207 as to whether an object of note is found. If an object of note is not found, the image and its corresponding data can be discarded. If an object of note is found, then at 209, the object of note is superimposed as an outline over an outline of the scanned target, and at 210, the final image is presented to the user. The image can be rendered on a screen on the device. Optionally, the image can be rendered on a smartphone or other mobile device. When rendered or displayed, the image can contain the original visual image of the target with representations of objects found. The multiple images can also be combined to create a video stream And because the scanning process provides ranging information, the device can provide a three-dimensional rendering of the image. In an embodiment, different colors are used to indicate the threat level of the detected object. As an example (but not the only example), a red outline displayed on the apparatus can indicate the presence and position of a gun. As another example (but not the only example), a green outline can be used to indicate the presence of keys, or some other equally innocuous object.

In an embodiment, an image of an identified object, or a representation thereof, can be superimposed of a representation of the scanned target. In an embodiment, the representation can be an outline of the scanned target, e.g., a generic outline of a human form, over which the image representing the identified object can be placed, providing the user with information about the positioning of the object on the subject's body, in addition to detailing the threat level of the object. In an embodiment, the representation of the scanned target can take the form of a variety of zones displayed on a screen positioned on the apparatus, or on a mobile device in communication with the apparatus.

Upon completion of a search, at 211, post-session processing takes place. This processing can include all or some of the following: tagging images or videos with metadata, gathering and uploading metadata, generating a report, providing a digital signature or certificate, archiving, and uploading the data (both received and processed) and metadata. In this step, images can be cryptographically tagged with various metadata and transmitted and stored on the device, or can be uploaded for further processing. If a data repository is used (e.g., a cloud-based database or an online server), the images, videos, and metadata can be stored there. Examples of metadata can include (but are not limited to) time stamps, geolocation data, device data, customer specific information (user, associated visual images), networked or connected devices, voice recordings, and session information. In an embodiment, a web-based service can be implements using public cloud infrastructure and services such as those provided by (but not limited to) AWS, Azure, and GCP.

Figure 3:
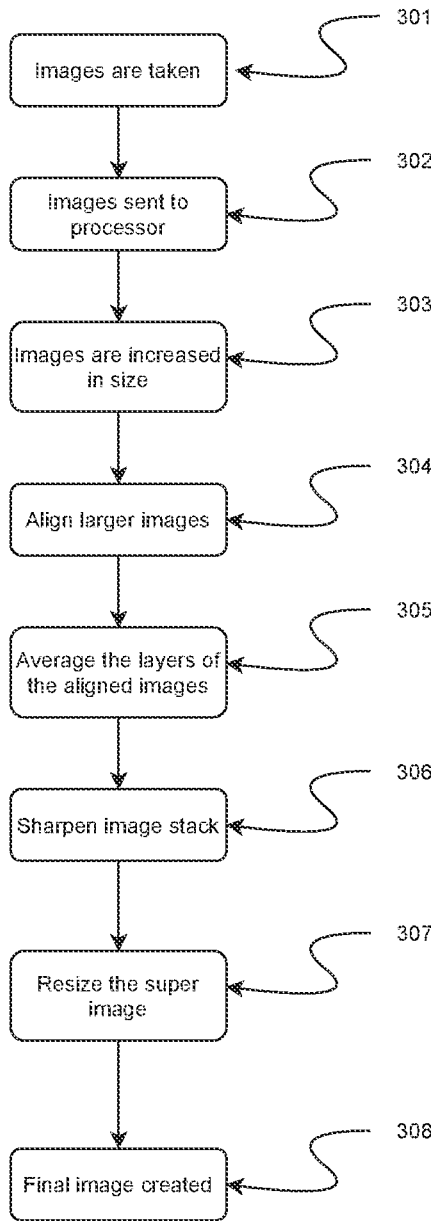
FIG. 3 is a flowchart of a method for creating a dataset from images taken by a non-invasive scanner, the dataset being appropriate for post processing and use in imaging and detection, according to an embodiment of the invention.

FIG. 3 is a flowchart of a method for creating a dataset of images to be used for imaging and detection, according to an embodiment. At 301, one or more images are taken. At 302, the images are sent to a processor for processing. The image or images received at the processor are increased in size by a predetermined amount creating a set of larger images, at 303. In an embodiment, the images are increased in size to achieve finer blending of the image stack in order to extract the high frequency data that is embedded in the low frequency data hidden in the aliasing.

At 304, at least a subset of images in the set of larger images are aligned, according to an embodiment. In an embodiment, at 305, the layers are averaged with linear opacity 1, 0.5, 0.25, 0.125, and so on, allowing images, in an embodiment, to be blended evenly, making use of the aliasing.

At 306, in an embodiment, the image stack, the plurality of images being combined, is sharpened using a predetermined radius. At 307, according to an embodiment, the final super image is resized. One skilled in the art will understand that the output can be resized to any desirable size using any practicable resampling method that provides an appropriate image. At 308, the super image is used to create the final image (seen in 206 from FIG. 2). Once the super image is created, the image is further processed, as detailed in FIG. 4, discussed below.

Figure 4:
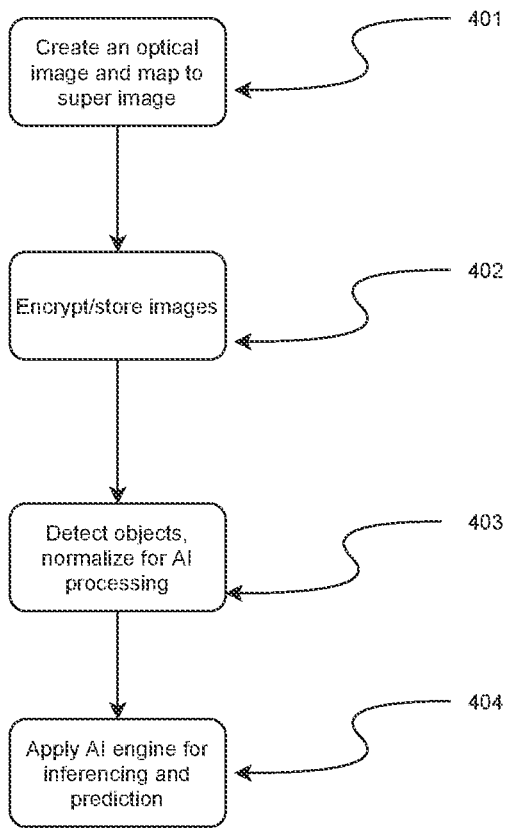
FIG. 4 is a flowchart of a method for processing a final image, according to an embodiment of the invention.

FIG. 4 is a flow chart of a method for processing the existing data to create a final image. At 401, an optical image is created and mapped to the super image creating a filtered image. In an embodiment, the apparatus uses a separate camera to create an optical image used as a base image configured to be mapped to the super image, according to an embodiment. In an embodiment, the separate camera is a digital camera using a CCD sensor, or a CMOS sensor, or any practicable sensor.

At 402, in an embodiment, the filtered images are encrypted, while the unfiltered image data is discarded. One skilled in the art will understand that the encryption can be performed using SSL or TLS secure encryption, or any practicable encryption. In an embodiment, the apparatus stores some or all of the filtered image locally. In an embodiment, the apparatus stores some or all of the filtered image in a backend cloud service where it can be archived or undergo additional processing, or both.

At 403, in an embodiment, the super image is analyzed to determine whether any objects of note are present on the subject, and if so, the super image is normalized for processing. In an embodiment, normalizing the super image means preprocessing it into a format, or with information, appropriate to feed an artificial intelligence system. This preprocessing can include (but is not limited to) scaling to a fixed width and height, conversion of the bit depth, shifting and or rotation of image. The processing can be performed by an artificial intelligence (AI) system.

At 404, once the objects have been normalized, the resultant image is transferred to an AI engine for pattern matching against known threats and then calculating the likelihood that the input data is a threat. As part of the image processing, in an embodiment, the apparatus performs an image search to match detected shapes against a prebuilt local image threat library, or a mathematical model representing such images, and makes a threat determination using parameters such as shape type, size, type of weapon, confidence level, contrast, and other parameters. Entries in the threat library can include some or all of the following: guns, knives, bombs and bomb vests, clubs, truncheons, bottles, and other objects of interest. In an embodiment, once a preliminary determination has been made that a weapon is suspected, the apparatus will focus in on the suspected weapon(s) and providing better image resolution to improving the detection confidence. In an embodiment, privacy filtering processing is applied, thus ensuring all locally storage body images are obfuscated as part of the image processing described in FIG. 3.

In an embodiment, the policies and control of the apparatus, the chip, and the general system, can be configured and controlled by a hierarchical set of domains allowing for different domains to grant configuration control to subordinate domains. In an embodiment, the policy and configuration control can be separated from the users of the device to ensure compliance, operational procedures, and in general simplicity of use. In an embodiment, the policy and configuration control can be performed and input by a local user.

In an embodiment, the policy and configuration control and be performed and input using an AI system.

Users can configure policies and alerts for different actions, and to provide feedback in different forms. In an embodiment, alerts can be visual (e.g., providing an outline of an object on a screen). In an embodiment, alerts can be audible (e.g., emitted by a device speaker or through an ear-piece). In an embodiment, alerts can trigger or prompt a user for additional actions of a remote device (e.g., via call to API), or other user defined actions.

In general, an event that triggers a display or alert of an unwanted object (as examples) can combined with, and work with, other events using, for example, Boolean logic to form complex triggers. Examples of triggers can include: More than two unidentified objects were found that were larger than a predetermined size. Events can include but are not limited to: an object is identified via machine learning with a predetermined probability; a person is identified via facial recognition, within a predetermined probability; an object of size greater than a predetermined size is found but not identified; an object of size smaller than a predetermined size is found but not identified; a search took place at a certain time of day, or within a certain range of times; and/or whether a contactless Terry Frisk is required; and any other event that can trigger an action.

Examples of alerts and controls can include: logging an event locally or in the cloud; logging an event in the cloud in either real time or in a batch upload; alerting a user with local audio, vibration, light or local display; alerting a user via a headset, earbuds, glasses, or any other remote device; texting to one or more mobile phone numbers or sending an alert to a mobile app; emailing an alert to one or more email addresses; providing a suggestion to a user on what a next step is for them to take, in addition to the alert itself; communicating to other contactless search devices as a remotely generated event; and calling a custom remote API, which can prompt some other action such as unlocking or locking a door, turning lights on or off, or any other customer-defined action.

FIG. 6 is a block diagram of a system 619 for providing a system for noninvasive imaging and detection in conjunction with a CEW 617 such as a Taser. For the purposes of the present invention, the term conducted energy weapons (CEW), conducted energy device (CED), projectile electric shock weapon (PEW), are used interchangeably, and can be used to refer to the class of devices that includes Tasers and stun guns, and any other device designed deploy electrodes that transmit an electrical charge or current to temporarily disable a person.

Typically, a CEW is a handheld device with a trigger, a safety, probes wired to a pulse generator and pulse controller, and disposable cartridges that use compressed gas such as nitrogen to launch the probes. Once the safety is off and the trigger is depressed, the taser fires two probes into a subject's body. The wires that connect the probes to the pulse generator transmit strong electrical pulses into the subject's body, thus immobilizing or incapacitating the subject by interfering with the subject's nervous system.

In an embodiment, as in FIG. 6, imaging and detection system 619 includes coherent radar system on a chip 601, core processing system 602, systems and communications 607, a camera 612, a display panel 614, user controls, and major program code 616. In addition, in an embodiment, the overall system includes a CEW 617 in communication with the imaging and detection system 619 via communication module 618. In an embodiment, the communication is via a wire or other electrical connection. In an embodiment, the communication is wireless.

In an embodiment, the CEW 617 and imaging and detection system 619 are contained in a single housing. In an embodiment, the CEW 617 and imaging and detection system 619 are contained in separate portable housings but in communication with each other by a wired communication connection. For the purposes of the present invention, the term "portable" means small enough to be transported by a user's hand such that, if contained in a distinct housing, the term "portable" is synonymous with "handheld."

The wire that provides the wired communication can be detachable from CEW 617, imaging and detection system 619, or both. In an embodiment, CEW 617 and imaging and detection system 619 are contained in separate housings configured to be rigidly attached to each other. In an embodiment, CEW 617 and imaging and detection system 619 are contained in separate housings configured to be rigidly, but not fixedly, attached to each other such that they are separable while still being used together, or are separable and are independently usable.

In an embodiment, CEW 617 will not be allowed to deploy until it receives an enabling signal, such as a signal to disengage a safety, or a signal that allows or causes the device to charge up, or a signal from imaging and detection system 619 that an impermissible object is present. Thus, if the system scans a subject but does not detect a weapon or other predetermined device, CEW 617 may not release the safety, or may not charge its electrodes, or may provide a signal to prevent the electrodes from being deployed. In an embodiment, if imaging and detection system 619 determine that a predetermined object or class of objects is present, it can send a signal to CEW 617 that allows CEW 617 to be used on the subject.

In an embodiment, core processing system on chip 602 includes processor 603, and logic 604 that is programmable by the user to determine whether and under what conditions to allow CEW 617 to be used on a subject. For example, a user may program the device, or may simply press a button 611 or select from a menu on display panel 614 a condition-based choice. In an embodiment, the device can be programmed, in the event the scan does not detect a weapon, to alert the user, to alert the user and not arm the CEW, to lock the device's safety, a choice to prevent the device from charging its electrodes, or a choice to otherwise not deploy the electrodes. In an embodiment, the device can be programmed, in the event the scan does, indeed, detect an impermissible device, to (i) alert the user; (2) alert the user and arm the CEW; or (3) alert the user and fire the CEW.

Figure 7:
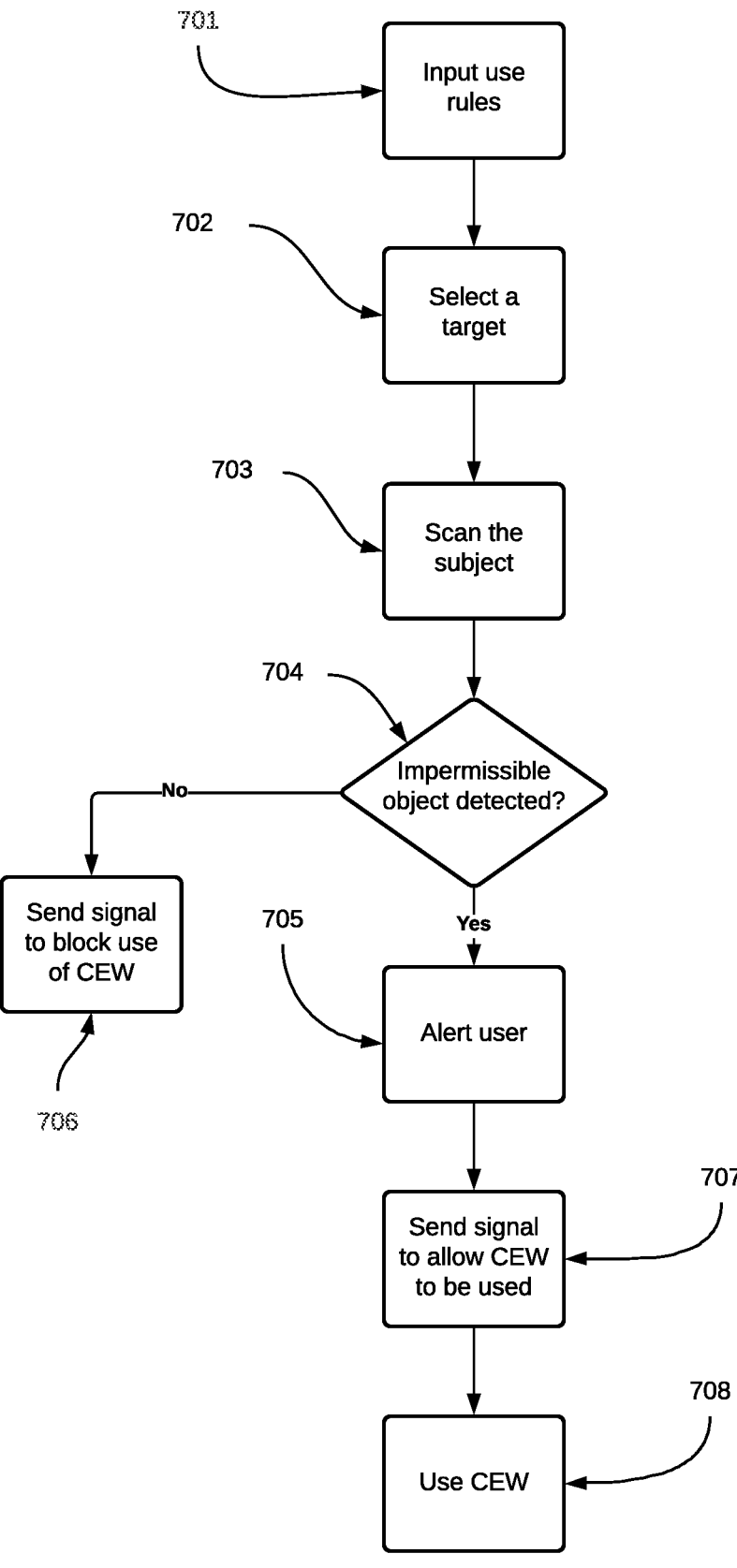
FIG. 7 is a flowchart of a method of using the system, according to an embodiment.

FIG. 7 is a flowchart of a method of using the system, according to an embodiment. At 701, rules for using the CEW in conjunction with the scanning function are input into the device. For example, the rules can allow the device to automatically deploy the electrodes if a weapon is detected, or can prevent the CEW from being used unless and/or until a weapon is detected.

At 702, a target is selected, typically by pointing the device at a subject. At 703, the device scans the subject, and, at 704, determines if an impermissible object is detected. If an impermissible object is detected at 704, then at 705, a processor sends a signal alerting the user to the existence of the impermissible object. In an embodiment, if an impermissible object is not detected at 704, then at 706, a signal is sent to prohibit the use of the CEW. For example, a signal could be sent locking the device's safety in place, or a signal could be sent preventing the charging system from charging the device, or sending a signal blocking the electrodes from being deployed. At 707, the processor sends a signal to allow the CEW to be used to incapacitate the subject. Finally, at 708, the user uses the CEW with the intent to incapacitate the subject without using lethal force.

One skilled in the art will understand, in the context of embodiments of the invention, that the term "a combination of" includes zero, one, or more, of each item in the list of items to be combined.

For the purposes of the present invention, the term computer program or computer code includes software, firmware, middleware, and any code in any computer language in any configuration, including any set of instructions or data intended for, and ultimately understandable by, a computing device.

One skilled in the art will understand that the order of elements described in each figure is given by way of example only. In an embodiment, the order of elements performed can be changed in any practicable way.

In some embodiments, the processes in FIGS. 2-4 and 7, or any portion or combination thereof, can be implemented as software modules. In other embodiments, the processes in FIGS. 2-4 and 7, or any portion or combination thereof, can be implemented as hardware modules. In yet other embodiments, FIGS. 2-7, any portion or combination thereof, can be implemented as a combination of hardware modules, software modules, firmware modules, or any form of program code.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of verified information described in relation to certain services can be applicable in other contexts. Thus, features described with reference to one or more embodiments can be combined with other embodiments described herein.

Although specific advantages have been enumerated above, various embodiments may include some, none, or all of the enumerated advantages. Other technical advantages may become readily apparent to one of ordinary skill in the art after review of the following figures and description.

It should be understood at the outset that, although exemplary embodiments are illustrated in the figures and described above, the present disclosure should in no way be limited to the exemplary implementations and techniques illustrated in the drawings and described herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

We claim:

1. A method comprising:
    scanning a subject with a portable coherent radar system on a single chip that operates in a range of operation between approximately 0.1 terahertz and 1 terahertz, the portable coherent radar system being in communication with a conducted energy weapon, the conducted energy weapon configured to allow a user to fire at least one electrode when an impermissible object is determined to be present on the subject;
    determining by a processor, based on the results of the scan, if the impermissible object is present on the subject;
    sending, by the processor, a signal to allow the user to fire the at least one electrode from the conducted energy weapon when the impermissible object is determined to be present on the subject;
    firing, by the user, the at least one electrode at the subject,
    where the portable coherent radar system includes:
        a transmitter having at least
        a ramp generator electrically coupled to, and configured to provide a voltage signal to, a wide band voltage controlled oscillator,
        a directional coupler electrically coupled to the wide band voltage controlled oscillator, and
        a phased-array antenna electrically coupled to the directional coupler and configured to transmit high-frequency signals in the range of operation.

2. The method of claim 1, further comprising: alerting a user when the impermissible object is present.

3. The method of claim 1, further comprising sending a signal to block the conducted energy weapon from firing the at least one electrode when an impermissible object is determined not to be present.

4. The method of claim 3, wherein the portable radar system includes processing components configured to process instructions to perform at least one of the following set of functions: alert the user to the detection of an object, alert the user to the result of a match between a detected object and an object stored in a database, render an image, display an image, initiate a scan, or process the results of the scan.

5. The method of claim 4, wherein the conducted energy weapon and the portable radar system are contained within a single housing.

6. The method of claim 4, wherein the conducted energy weapon is contained in a first housing, and the portable radar system is contained within a second housing that is not the first housing, and that is configured to be rigidly connected to the first housing.

7. The method of claim 4, wherein the conducted energy weapon comprises at least one electrode, and wherein the conducted energy weapon is configured to not deploy the at least one electrode until a signal is received from the portable radar system that allows the conducted energy weapon to deploy the at least one electrode.

8. The method of claim 3, further comprising:
    executing instructions, on the processor, to create one or more digital images based on said scanning;
    combining, at the processor, the one or more digital images to form a super image;
    determining, at the processor and based on the super image, whether the subject is carrying a concealed object;
    determining, at the processor, whether the object meets certain rules for generating an alert;
    generating the alert.

* * * * *